US012705416B1

(12) United States Patent
Monga et al.

(10) Patent No.: US 12,705,416 B1
(45) Date of Patent: Aug. 11, 2026

(54) MACHINE LEARNING BASED AUTOMATED ELECTRONIC DOCUMENT PROCESSING SYSTEM

(71) Applicant: INTUIT INC., Mountain View, CA (US)

(72) Inventors: Ria Monga, Bengaluru (IN); Sourodeep Chatterjee, Bengaluru (IN); Chandrashekhar Jha, Bengaluru (IN)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 19/254,900

(22) Filed: Jun. 30, 2025

(51) Int. Cl.

| | |
|---|---|
| ***G06F 40/151*** | (2020.01) |
| ***G06F 8/40*** | (2018.01) |
| ***G06F 40/103*** | (2020.01) |
| ***G06F 40/177*** | (2020.01) |

(52) U.S. Cl.
CPC .............. *G06F 40/151* (2020.01); *G06F 8/40* (2013.01); *G06F 40/103* (2020.01); *G06F 40/177* (2020.01)

(58) Field of Classification Search
CPC ........ G06F 40/151; G06F 8/40; G06F 40/103; G06F 40/177
See application file for complete search history.

(56) References Cited

U.S. PATENT DOCUMENTS

2010/0114843 A1* 5/2010 Farrar ................. G06F 16/2255 707/693
2022/0027740 A1* 1/2022 Dong .................... G06F 18/214

FOREIGN PATENT DOCUMENTS

WO WO-2025165252 A1 * 8/2025 ........... G06F 40/177

* cited by examiner

*Primary Examiner* — Asher D Kells
(74) *Attorney, Agent, or Firm* — Patterson + Sheridan, LLP

(57) ABSTRACT

Aspects of the present disclosure relate to automated document processing systems. In particular, embodiments disclosed herein provide an architecture for seamlessly integrating code representations of electronic documents generated by various different extraction systems into a single document processing system. Certain embodiments provide for generating a code representation of an electronic document based on an entity extracted from the electronic document. The code representation includes an entity representation that comprises an index indicator appended to an identifier for the entity, which may comprise a column of items. Some embodiments provide for applying a transformation to the entity representation to produce an intermediate code representation of the electronic document, wherein the transformation comprises a format for entities or a format for entity representations. Certain embodiments provide for generating an updated code representation of the electronic document based on matching indexed item values from the electronic document to the transformed entity representation.

18 Claims, 7 Drawing Sheets

```
inventory[*].itemName: inventory[*].item_name
```

Inventory

| Date Received | Item Name | Quantity |
|---|---|---|
| Dec 02 | Tomatoes | 50 |
| Dec 02 | Onions | 50 |
| Dec 03 | Potatoes | 83 |
| Dec 07 | Tomatoes | 24 |
| Dec 07 | Onions | 24 |
| Dec 09 | Cucumbers | 100 |

FIG. 3A

```
inventory[0].date = Dec 02
inventory[1].date = Dec 02
inventory[2].date = Dec 03
inventory[3].date = Dec 07
inventory[4].date = Dec 07
inventory[5].date = Dec 09
```

FIG. 3B

```
inventory[0].quantity = 50
inventory[1].quantity = 50
inventory[2].quantity = 83
inventory[3].quantity = 24
inventory[4].quantity = 24
inventory[5].quantity = 100
```

FIG. 3C

```
inventory[0].item_name = tomatoes
inventory[1].item_name = onions
inventory[2].item_name = potatoes
inventory[3].item_name = tomatoes
inventory[4].item_name = onions
inventory[5].item_name = cucumbers
```

FIG. 3D

```
inventory[*].date

inventory[*].item_name

inventory[*].quantity
```

FIG. 4A

```
inventory[*].itemName: inventory[*].item_name
```

FIG. 4B

```
key : inventory[*].date

formatter : format2
```

FIG. 4C

```
inventory[0].date = 12/2

inventory[1].date = 12/2

inventory[2].date = 12/3

inventory[3].date = 12/7

inventory[4].date = 12/7

inventory[5].date = 12/9
```

FIG. 5A

```
inventory[0].itemName = tomatoes

inventory[1].itemName = onions

inventory[2].itemName = potatoes

inventory[3].itemName = tomatoes

inventory[4].itemName = onions

inventory[5].itemName = cucumbers
```

FIG. 5B

MACHINE LEARNING BASED AUTOMATED ELECTRONIC DOCUMENT PROCESSING SYSTEM

INTRODUCTION

Aspects of the present disclosure relate to techniques for processing electronic documents. In particular, techniques described herein allow for applying transformations simultaneously to multiple entities within a representation of an electronic document, which may significantly streamline document processing tasks.

BACKGROUND

Every year a growing number of people, businesses, and organizations around the world utilize automated document processing systems. For example, users of a software application may submit documents to the application by capturing images of the documents. The contents of the documents may then be extracted from the images and used for various tasks.

However, there are numerous technical challenges associated with implementing such automated document processing systems. For example, data that is extracted (e.g., using an extraction model) must be delivered to a document processing system in a format that is compatible with the system. If the data is in the wrong format, the document processing system may make severe errors or be unable to process the documents at all. This problem is compounded in the context of updating and modifying the document processing systems and extraction systems. For example, if the code of a document processing system is updated, the extraction systems used to extract and provide data from documents may require updates as well so that the extracted information is delivered in a compatible format. As another example, if more than one extraction system is used (as is frequently the case when documents from more than one domain are consolidated into a single repository), the data from each extraction system may require modifications that are specific to each extraction system.

Existing techniques for making such modifications to extraction systems and the extracted data are inefficient and prone to error. For example, data extracted by an extraction system may be compatible with a first processing system and incompatible with a second processing system. To make the data from the extraction system compatible with the second processing system, the data may need to be transformed to the compatible format. However, existing techniques may require item-by-item modification of all items within the extracted information. This item-by-item modification may add significant latency to document processing tasks, and may require a significant amount of computational resources to perform. Additionally, with item-by-item transformation, each item increases the chance that an error will be made.

Thus, there is a need in the art for improved techniques of processing electronic documents.

BRIEF SUMMARY

Certain embodiments provide a method of automatically processing electronic documents. The method generally includes: generating a code representation of an electronic document based on an entity extracted from the electronic document, wherein the code representation includes an entity representation for the entity that comprises an index indicator appended to an identifier for the entity, wherein the entity comprises a row of items or a column of items; applying a transformation to the entity representation to produce an intermediate code representation of the electronic document, wherein the transformation comprises a format for entities or a format for entity representations; and generating an updated code representation of the electronic document based on matching indexed item values from the electronic document to the transformed entity representation.

Other embodiments provide processing systems configured to perform the aforementioned method as well as those described herein; non-transitory, computer-readable media comprising instructions that, when executed by one or more processors of a processing system, cause the processing system to perform the aforementioned method as well as those described herein; a computer program product embodied on a computer readable storage medium comprising code for performing the aforementioned methods as well as those further described herein; and a processing system comprising means for performing the aforementioned method as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 3A depicts an example of an electronic document.

FIG. 3B depicts an example of item representations for items within an example electronic document.

FIG. 3C depicts an additional example of item representations for items within an example electronic document.

FIG. 3D depicts an additional example of item representations for items within an example electronic document.

FIG. 4A depicts an example of entity representations for entities within an example electronic document.

FIG. 4B depicts an example of a transformation applied to an example entity representation.

FIG. 4C depicts an additional example of a transformation applied to an example entity representation.

FIG. 5A depicts example transformed item representations.

FIG. 5B depicts additional example transformed item representations.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
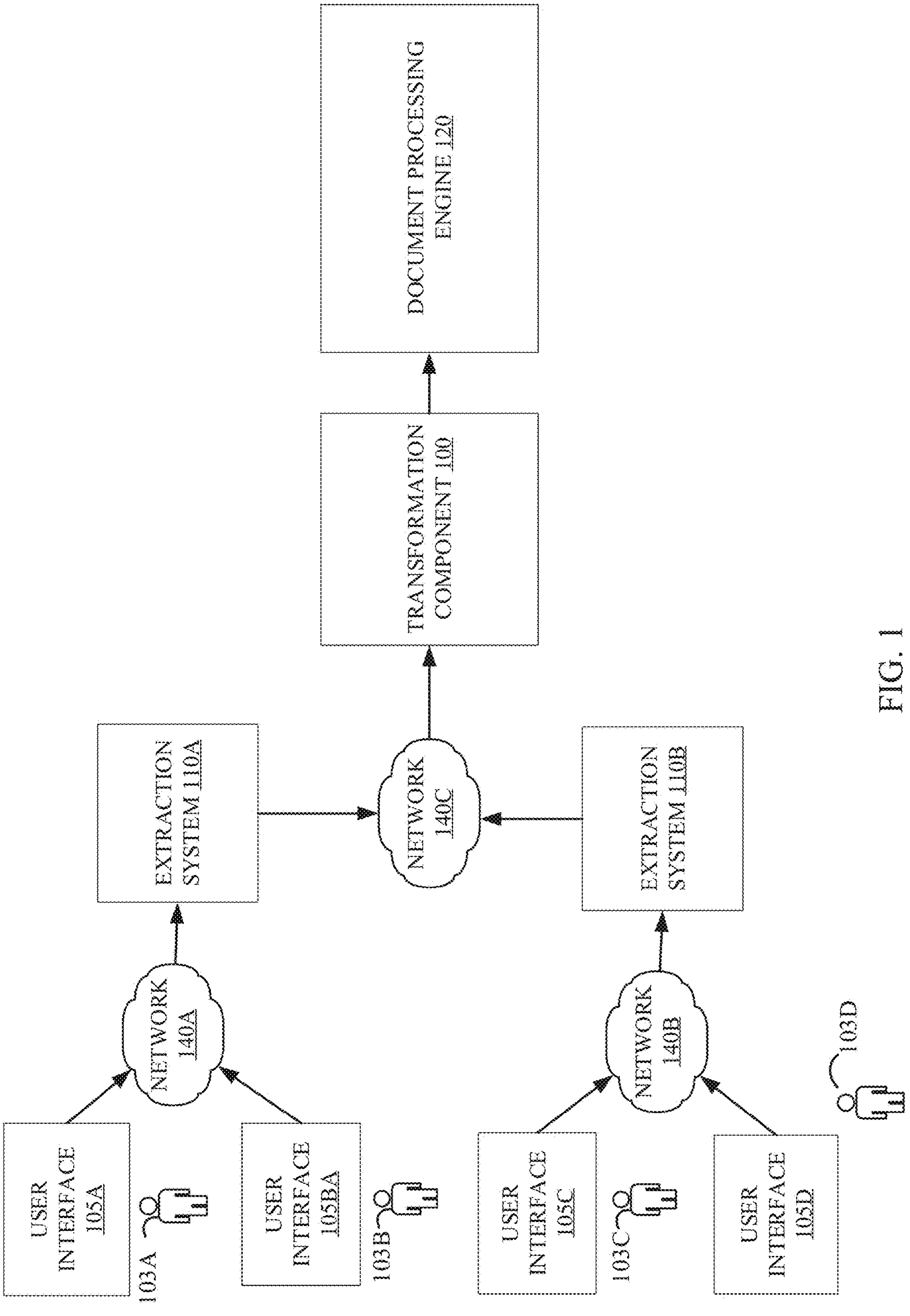
FIG. 1 depicts an example of computing components related to automatically processing electronic documents.

Aspects of the present disclosure provide apparatuses, methods, processing systems, and computer-readable mediums for automatically processing electronic documents.

In order to overcome technical challenges associated with conventional techniques for automatically processing electronic documents, such as achieving compatibility across systems and improving computational efficiency, aspects of the present disclosure introduce particular techniques for generating a code representation of an electronic document. The code representation may comprise a representation of the electronic document in computer code that corresponds to a programming language. The code representation may be generated based on entities such as rows and columns of data that are extracted from the electronic document. For example, the electronic document may be provided as input to a machine learning model that is configured to extract entities from the document, and the machine learning model may extract the entities. The same machine learning model or a different machine learning model may generate the computer code representation of the electronic document based on the extracted entities.

The code representation may include an entity representation that comprises an identifier for the entity and an appended index indicator. The entity representation may represent each item within the entity, and the individual items may be stored within an index. A transformation may be applied to the entity representation, and then a finalized code representation of the electronic document may be generated by populating the entity representation with the indexed values. The finalized code representation may then be used to perform automated tasks involving the electronic document.

Embodiments of the present disclosure provide numerous technical and practical effects and benefits. For example, while conventional techniques for applying changes to extracted document data require item-by-item editing, techniques disclosed herein provide for implementing large-scale changes on entity representations that represent multiple items. This entity-by-entity transformation process significantly reduces the complexity, computational overhead, latency, and probability of error associated with transforming code representations of electronic documents. As a result, embodiments disclosed herein allow for accurately and efficiently transforming code representations of documents into formats that are compatible with various electronic document processing systems.

Furthermore, embodiments of the present disclosure allow for seamlessly scaling electronic document processing systems. For example, different extraction systems associated with different domains may generate code representations of documents in different formats. Techniques described herein allow for transforming code representations of documents into formats that are compatible with electronic document processing systems accurately and efficiently. Thus, embodiments of the present disclosure may be used to convert the different formats of code representations into the compatible format. Accordingly, document extraction and code representation generation systems that would otherwise be incompatible with a document processing system may be used to generate code representations of documents that are then used by the document processing system. As a result, electronic documents from different domains that are extracted using different extraction systems may be integrated into a common document processing system.

Example of Computing Components Related to Automatically Processing Electronic Documents FIG. 1 depicts an example of computing components related to automatically processing electronic documents.

Users 103A-D of software applications may interact with the applications via user interfaces 105A-D associated with computing devices. The users 103A-D may upload electronic documents via the user interfaces 105A-D. For example, user 103A may use a computing device to capture an image of a document, and the image may be transmitted over network 140A to extraction system 110A. As another example, user 103D may generate an electronic document such as a portable document format (PDF) document at user interface 105D, and the electronic document may be transmitted over network 140B to extraction system 110B.

Extraction systems 110A and 110B may be used to extract entities (e.g., rows and columns) from the electronic documents and/or generate code representations of the electronic documents. For example, extraction systems 110A and 110B may comprise one or more machine learning models that are configured to extract the entities and generate the code representations. A code representation generated by the extraction system 110A may correspond to a first format (e.g., in the first format, entities may be labeled according to a first convention and/or the like). A code representation generated by the extraction system 110B may correspond to a second format (e.g., in the second format, entities may be labeled according to a second convention and/or the like). In some embodiments, the first and second formats are each incompatible with document processing engine 120 and must be transformed by transformation component 100.

The document processing engine 120 may generally be any form of computing system capable of processing/interacting with electronic documents based on code representations of the documents. For example, the document processing engine 120 may comprise a virtual repository that stores the contents of electronic documents provided by the different users of an application. As another example, the document processing engine 120 may be part of a computing system that helps users 103A-D perform tasks involving the documents (e.g., the computing system may generate additional documents or other forms of content based on the electronic documents).

As mentioned above, code representations of electronic documents received from the extraction systems 110A and 110B may be incompatible with the document processing engine (e.g., the code representations may use a naming convention that is not compatible with the document processing engine 120). Thus, the code representations may be provided to a transformation component 100 that transforms the code representations into a format that is compatible with the document processing engine 120. Accordingly, the transformation component 100 may serve as a bridge layer between various extraction systems and the document processing engine 120, allowing extraction systems that would otherwise be incompatible with document processing engine 120 to be used with document processing engine 120.

The transformation component 100, extraction systems 110A and 110B, and the document processing engine 120 may communicate over a network 140C. Networks 140A-C may be any connection over which data may be transmitted. In one example, networks 140A-C are the Internet.

Figure 2:
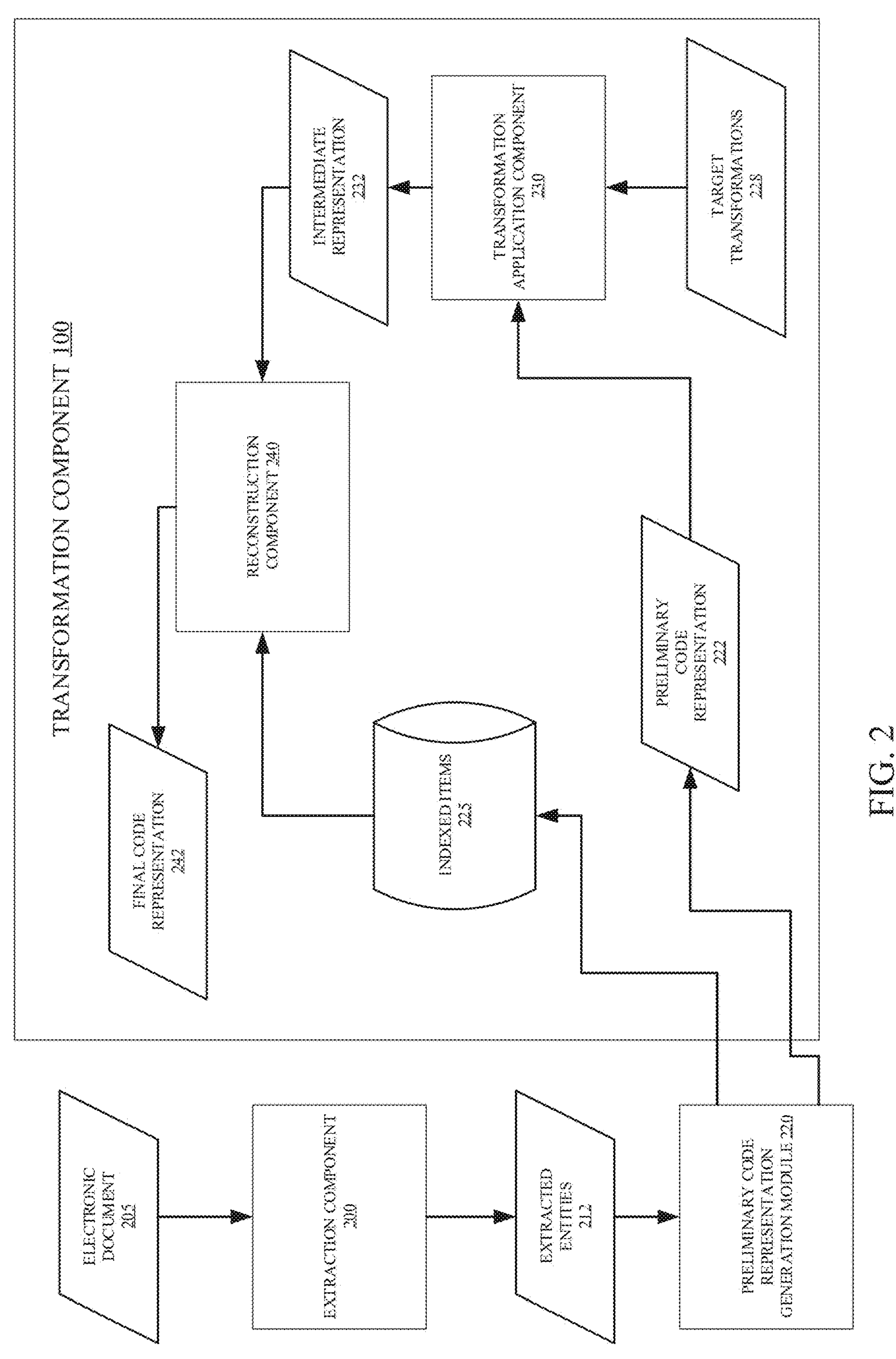
FIG. 2 depicts an additional example of computing components related to automatically processing electronic documents.

FIG. 2 depicts an additional example of computing components related to automatically processing electronic documents. In particular, FIG. 2 depicts functionality that may be performed by the transformation component 100 of FIG. 1.

An electronic document 205 may generally be any type of document in electronic form. For example, the electronic document 205 may be an image of a physical document, a PDF file, a word processing document file, and/or the like.

The electronic document may be provided to an extraction component 200. The extraction component 200 may be part of extraction system 110A or 110B of FIG. 1. Extraction component may comprise a computing component that is configured to use optical character recognition (OCR) or similar techniques to extract text from electronic documents. In some embodiments, the extraction component 200 comprises a machine learning model that is trained and/or otherwise configured to extract text from electronic documents (e.g., the machine learning model may generate an output that indicates text within the document).

OCR is a technology that involves the conversion of different types of documents, such as scanned paper documents, PDF files, or images captured by a digital camera, into editable and searchable data. The process generally begins with the acquisition of an image containing text, which is then subjected to preprocessing steps to enhance the quality of the image for better recognition accuracy. These preprocessing steps may include noise reduction, binarization, and skew correction. The core of OCR technology is typically a recognition engine, which employs pattern recognition algorithms and/or techniques to identify and extract text characters from the image. This engine typically utilizes machine learning models, such as convolutional neural networks (CNNs), to classify and recognize individual characters or words. The recognized text is then subjected to post-processing, which may involve spell-checking and context analysis to improve accuracy. OCR systems may also incorporate techniques such as automated layout analysis to preserve the formatting and structure of the original document. The output of the OCR process generally includes text entities that were extracted from the document, and may be in the form of a digital text file that can be edited, searched, and indexed, facilitating data extraction and document management.

Thus, the extraction component 200 may generate an output comprising extracted entities 212. The extracted entities 212 may comprise one or more text items extracted from the electronic document 205. For example, the electronic document 205 may include a table. An entity extracted from the electronic document 205 may comprise a row of data items within the table. An entity extracted from the electronic document 205 may comprise a column of data items within the table.

The extracted entities 212 may be provided to a preliminary code representation generation module 220. The preliminary code representation generation module 220 may be part of extraction system 110A or 110B of FIG. 1. The preliminary code representation generation module 220 may be used to generate a preliminary code representation 222 of the electronic document 205, which may be a computer code representation of the electronic document 205. The preliminary code representation 222 may be in a format that is not compatible with an automated document processing system. Or, the preliminary code representation 222 may otherwise require updates. To implement the updates and make a code representation that is compatible with an automated document processing system, the preliminary code representation 222 may be provided to the transformation component 100.

In some embodiments, the preliminary code representation generation module 220 comprises a generative machine learning model that is trained and/or otherwise configured to generate preliminary code representations of electronic documents.

The preliminary code representations generated by the preliminary code representation generation module 220 may include representations of each entity within an electronic document. For example, a column within a document may be an entity that is extracted from the document. An entity representation for the entity may comprise an entity identifier with an appended index indicator. The entity identifier may be a name or other type of identifier for the entity (e.g., the entity identifier for a column that contains a list of prices for different products may be "productPrice"). The index indicator may be any type of identifier (e.g., a character or symbol) that indicates that the entity is a row/column/table. For example, the index indicator may be a character within brackets (e.g., the index indicator may be "[*]"). Entity representations are discussed in further detail below with respect to FIG. 4A.

The data items for each of the extracted entities 212 may be stored in an index of indexed items 225. For example, an entity may comprise a column of data items. For this entity, the data item in the first row of the column may be stored in the first index position for the entity, the data item in the second row of the column may be stored in the second index position for the entity, and so on.

The preliminary code representation 222 may be provided to a transformation application component 230. The transformation application component 230 may be a computing component that is configured to apply target transformations 228 to the preliminary code representation 222. The target transformations 228 may comprise a target format for different aspects of the electronic documents and/or code representations of electronic documents. For example, the target transformations 228 may include a target entity identifier for a particular type of entity (e.g., the entity identifier may be "productPrice," and the target entity identifier may be "prod_price"). The target transformations 228 may be manually specified by a user (e.g., the target transformations 228 may be entered via a user interface), or the target transformations 228 may be selected automatically based on the processing system to which the electronic document 205 is to be provided.

The target transformations 228 may be applied to the entity representation for an entity. For example, an instruction/command may be appended to the entity identifier or entity representation based on a target transformation for the entity. For example, the target entity identifier "prod_price" may be appended to the entity representation "productPrice [*]." The target transformations 228 may be applied to produce an intermediate representation 232, an intermediate computer code representation of the electronic document 205.

The intermediate representation 232 may be provided to a reconstruction component 240, a computing component configured implement the applied target transformations 228 while populating a code representation with data items from the indexed items 225 to generate a final code representation 242. For example, the preliminary code representation 222 for the electronic document 205 may include the entity representation "productPrice[*]," which represents a column within the electronic document 205 that contains prices for different products. Each product price may be a row within the column, and each product price may be stored in an index. The transformation application component 230 may apply "prod_price," a target entity identifier for the entity representation, to the entity representation (e.g., by appending "prod_price" to the entity representation or including another type of indication that the entity identifier should be changed to "prod_price"). Then, the reconstruction component 240 may generate the final code representation 242 by populating the previously indexed price values into item representations that include the updated entity identifier "prod_price." For example, the price of the first product listed in the electronic document 205 may be twenty dollars and the price of the second product listed in the electronic document 205 may be fifty dollars. The final code representation 242 may include "prod_price[1]=20," an item representation for the first data item of the entity. The final code representation 242 may include "prod_price[2]=50," an item representation for the second data item of the entity.

The final code representation 242 may be a computer code representation of the electronic document 205 that is in a format that is compatible with an automated document processing system. For example, the processing system may be configured to recognize "prod_price" as an identifier for product prices, but "productPrice" may be an undefined variable that the processing system cannot process.

A machine learning model, such as a machine learning model that is part of preliminary code representation generation module 220 (or any other model used in techniques described herein) may be trained based on supervised, unsupervised or semi-supervised learning techniques. Supervised learning techniques generally involve providing training inputs to a machine learning model. The machine learning model processes the training inputs and outputs predictions based on the training inputs. The predictions are compared to known labels associated with the training inputs to determine the accuracy of the machine learning model, and parameters of the machine learning model are iteratively adjusted until one or more conditions are met. For instance, the one or more conditions may relate to an objective function (e.g., a cost function or loss function) for optimizing one or more variables (e.g., model accuracy). In some embodiments, the conditions may relate to whether the predictions produced by the machine learning model based on the training inputs match the known labels associated with the training inputs or whether a measure of error between training iterations is not decreasing or not decreasing more than a threshold amount. The conditions may also include whether a training iteration limit has been reached. Model parameters adjusted during training may include, for example, hyperparameters, values related to numbers of iterations, weights, functions used by nodes to calculate scores, level of randomness, and/or the like. In some embodiments, validation and testing are also performed for a machine learning model, such as based on validation data and test data, as is known in the art.

In some embodiments, back-propagation is used to train one or more of the machine learning models disclosed herein. Back-propagation refers to a process of calculating a gradient based on a loss function, comparing recreated input with the actual input or comparing a generated output with a ground truth output. By propagating this gradient "back" through the layers of the machine learning model, the weights can be modified to produce more accurate outputs on subsequent attempts.

A code representation of an electronic document generated using techniques described herein may enable a wide variety of automated processing of such an electronic document by electronic document processing systems. For instance, an electronic document processing system could parse the document to extract metadata such as the author, creation date, and document type. In another example, an electronic document processing system may perform text analysis to identify key phrases or topics within the document, enabling categorization or tagging for easier retrieval. Additionally, an electronic document processing system could convert the document into different formats to facilitate editing, web publishing, or the like. Furthermore, an electronic document processing system could apply natural language processing techniques to summarize the document's content, providing users with a concise overview without needing to read the entire document. In other examples, an electronic document processing system could automatically categorize a document, modify a document, perform other types of analysis on the document, and/or the like. These examples illustrate the diverse ways in which an electronic document can be processed based on a code representation generated using techniques described herein to enhance accessibility, usability, and functionality within a software application, regardless of whether the original document is in a format that was compatible with the software application.

FIG. 3A depicts an example of an electronic document. The electronic document is an inventory table that lists the received inventory for a grocery store. The document includes three column entities—a date received column, an item name column, and a quantity column. The first row of items in each column represents the first group of items received by the grocery store. On December $2^{nd}$, the grocery store received a shipment of fifty tomatoes. Thus, the first item in the date received column is "Dec 02," the first item in the item name column is "tomatoes," and the first item in the quantity column is "50."

FIG. 3B, FIG. 3C, and FIG. 3D depict examples of item representations that may be found in an initial computer code representation of the document shown in FIG. 3A. The item representations shown in FIG. 3B depict item representations for the date received entity, the item representations shown in FIG. 3C depict item representations for the quantity entity, and the item representations shown in FIG. 3D depict item representations for the item name entity. The last item in the date received entity is "Dec 09," the date in which a shipment of one hundred cucumbers was received. In FIG. 3B, this item is represented by the item representation "inventory[5].date=Dec 09." This item representation includes an identifier for the table ("inventory") and an identifier for the entity ("date"). The item representation also includes index brackets and the index position indicator for the item. The index position is "5," meaning that the value "Dec 09" is in the fifth position of the index. "Dec 02" is the value in the zeroth and first positions, "Dec 03" is the value in the second position, and "Dec 07" is the value in the third and fourth positions. In FIG. 3C, the item in the zeroth and first positions is "50," the item in the second position is "83," the item in the third and fourth positions is "24," and the item in the fifth index position is "100." The entity identifier in each of the entity representations is "quantity." In FIG. 3D, the item in the zeroth and third positions is "tomatoes," the item in the first and fourth positions is "onions," the item in the second position is "potatoes," and the item in the fifth index position is "cucumbers." The entity identifier in each of the entity representations is "item_name," which refers to the name of the grocery product.

FIG. 4A depicts examples of entity representations for the entities depicted in FIGS. 3A-D.

The entity identifier for the date received entity includes the entity identifier ("date") and an index indicator ("[*]"). The entity identifier also includes the identifier for the table ("inventory").

The entity identifier for the item name entity includes the entity identifier ("item_name") and an index indicator ("[*]"). The entity identifier also includes the identifier for the table ("inventory").

The entity identifier for the quantity entity includes the entity identifier ("quantity") and an index indicator ("[*]"). The entity identifier also includes the identifier for the table ("inventory").

The index indicator shown in FIG. 4A indicates to a reconstruction component (such as reconstruction component 240 of FIG. 2) that the identifiers (here, "date," "item_name," and "quantity") correspond to entities (e.g., rows, columns, or tables). Based on an index indicator being located next to an identifier, the reconstruction component retrieves indexed values associated with the identifier. For example, in the process of creating a code representation of the electronic document shown in FIG. 3A, the item values for the quantity entity may be stored in an index (as discussed above). The reconstruction component may generate a final code representation of the document by generating updated item representations. The updated item representations may be generated based on retrieving the indexed item values and appending these values and the respective index position indicators for each value to the entity identifier. In some embodiments, the entity identifier in the updated item representation may be an updated entity identifier, as discussed in further detail below with respect to FIG. 4B. In some embodiments, the retrieved value may be converted into a target format, as discussed in further detail below with respect to FIG. 4C.

FIG. 4B depicts an example of a transformation applied to an example entity identifier. The transformation may be applied by transformation application component 230 of FIG. 2. In this example, the transformation is applied by appending a target entity representation to the original entity representation for the item name entity. The target entity representation is appended before the original entity representation in this example. The target entity representation includes an updated entity identifier. Whereas the original entity identifier was "item_name," the updated entity identifier is "itemName." Based on the applied transformation, the reconstruction component may automatically generate the final code representation using the target entity identifier, as described below with respect to FIG. 5B.

FIG. 4C depicts an example of a transformation applied to an example entity identifier. The transformation may be applied by transformation application component 230 of FIG. 2. The transformation is applied by appending a target data item format to the entity representation for the date entity. The target data item format is appended on a separate line after the entity identifier in this example. The target data format is "format2." As depicted below with respect to FIG. 5A, format2 represents the date December $2^{nd}$ as 12/2 instead of Dec 02. Another format, format3, may represent the same date as 02/12 or 2 DEC.

FIG. 5A and FIG. 5B depict example updated item representations found within a final code representation of the electronic document shown in FIG. 3A based on the transformations applied in FIG. 4B and FIG. 4C.

As shown in FIG. 5A, a final code representation for the electronic document includes updated item representations for the items within the date received entity. These updated item representations are generated based retrieving the data item values for the entity. The retrieved data item values are appended to the entity identifier ("date") and matched with the index position indicator for each respective data item value. For example, the data item value in the fifth position of the index is "Dec 09." Based on the transformation applied in FIG. 4C, the data item value is represented as "12/9." The reconstruction component thus appends "12/9" to the entity identifier "date," along with the index position indicator "5," which indicates that "12/9" is value for the fifth data item in the date entity. Thus, the fifth value is matched with the fifth item representation. Similarly, the data value "12/2" may be appended to the entity identifier "date" along with the index position indicator "0," which indicates that "12/2" is the value for the zeroth data item in the entity. Thus, the zeroth value is matched with the zeroth item representation. The retrieving and appending may also be performed for the other data items in the entity (items 1-4) to generate the item representations shown in FIG. 5A.

As shown in FIG. 5B, a final code representation for the electronic document includes updated item representations for the items within the item name entity. These updated item representations are generated based retrieving the data item values for the entity. The retrieved data item values are appended to the updated entity identifier ("itemName") instead of the original entity identifier ("item_name"). The index position indicator for each respective data item value may matched to the respective item value and appended as well. For example, the data item value in the fifth position of the index is "cucumbers." The reconstruction component thus appends "cucumbers" to the entity identifier "itemName," along with the index position indicator "5," which indicates that "cucumbers" is the value for the fifth data item in the date entity. Thus, the fifth value is matched with the fifth item representation. Similarly, the data value "tomatoes" may be appended to the entity identifier "itemName" along with the index position indicator "0," which indicates that "tomatoes" is the value for the zeroth data item in the entity. Thus, the zeroth value is matched with the zeroth item representation. The retrieving and appending may also be performed for the other data items in the entity (items 1-4) to generate the item representations shown in FIG. 5B.

The updated item representations shown in FIG. 5A thus represent the "date received" data item values such that December $7^{th}$ is represented as 12/7. By contrast, the item representations in the original code representation of the electronic document represent the "date received" data item values such that December $7^{th}$ is represented as Dec 07. This change was applied to all of the data item values based on a single transformation that was applied to the entity representation for the "date received" entity. The single transformation was then implemented automatically by retrieving the indexed data values and appending the data values and respective index indicators to the entity identifier.

Similarly, the updated item representations shown in FIG. 5B each include the updated entity identifier "itemName." By contrast, the item representations in the original code representation of the electronic document include the original entity identifier "item_name." This change was applied to all of the item representations based on a single transformation that was applied to the entity representation for the "item name" entity. The single transformation was then implemented automatically by retrieving the indexed data values and appending the data values and respective index indicators to the updated entity identifier.

In some embodiments, nested entities may be represented by appending an additional index indicator and a nested entity identifier to an entity identifier. For example, a column within a document may contain addresses. Each address may be a data item within the column. Also, each line of the address may be a nested data item within the address. Thus, the address may be a nested entity. An entity representation for the column may comprise, for example, tableName.address[*].addressLine[*], wherein "tableName" is an identifier for the table that contains the column, "address" is an entity identifier for the column, and "addressLine" is the nested entity identifier for the lines of the address. Transformations may be applied to the entity representation, and a final code version of the document that contains the address column may be generated by retrieving the addresses and generating updated item representations. Updated item representations may be generated for each line of each address.

Example Operations Related to Automatically Processing Electronic Documents

Figure 6:
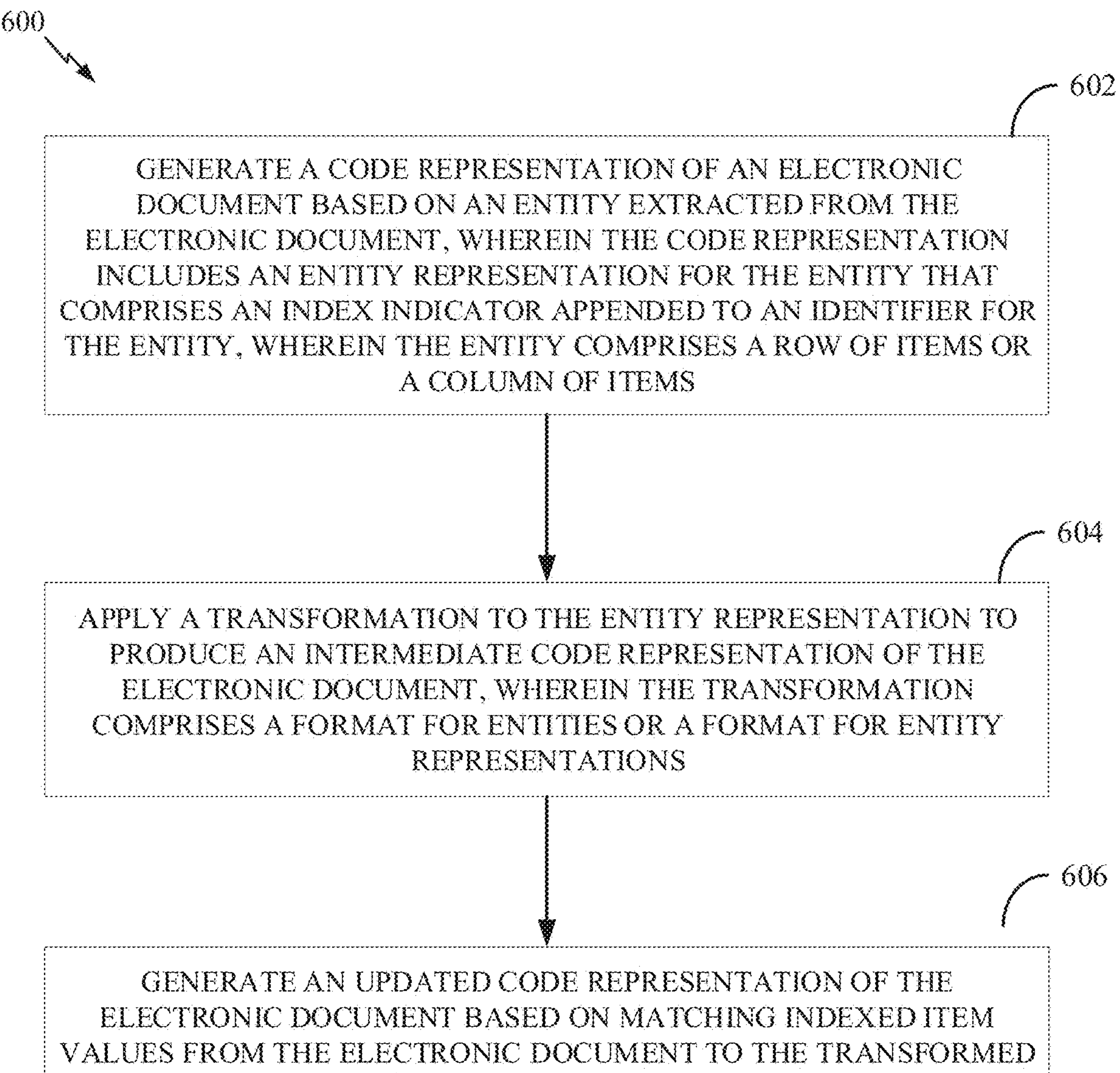
FIG. 6 depicts example operations related to automatically processing electronic documents.

FIG. 6 depicts example operations 600 related to automatically processing electronic documents. For example, operations 600 may be performed by one or more of the components described with respect to FIG. 1 and FIG. 2.

Operations 600 begin at step 602 with generating a code representation of an electronic document based on an entity extracted from the electronic document, wherein the code representation includes an entity representation for the entity that comprises an index indicator appended to an identifier for the entity, wherein the entity comprises a row of items or a column of items. In certain embodiments, the entity is extracted using an extraction machine learning model that is configured to extract entities from documents. According to some embodiments, the entity comprises a column and each respective item within the entity comprises a value for the column at a respective row.

Operations 600 continue at step 604 with applying a transformation to the entity representation to produce an intermediate code representation of the electronic document, wherein the transformation comprises a format for entities or a format for entity representations. According to some embodiments, the transformation is applied automatically based on a target format for the transformed entity representation, wherein the target format is a format that is compatible with an electronic document processing system. Some embodiments provide that an original format for the entity representation is incompatible with the electronic document processing system. In certain embodiments, the transformation is applied based on user input specifying a format for entities or a format for entity representations. In certain embodiments, the format for entity representations comprises a different identifier for the entity.

Operations 600 continue at step 606 with generating an updated code representation of the electronic document based on matching indexed item values from the electronic document to the transformed entity representation. Certain embodiments provide that generating the updated code representation of the electronic document comprises generating an item representation comprising a given value and a given index position indicator appended to the identifier for the entity, wherein the given value is a value for the column at a row that is indicated by the given index position indicator. In certain embodiments, item values are extracted and stored in an index, wherein the given value is retrieved from the index based on matching the given index position indicator to a position in the index that contains the given value.

According to some embodiments, Operations 600 further comprise automatically processing the electronic document by the electronic document processing system based on the updated code representation.

Figure 7:
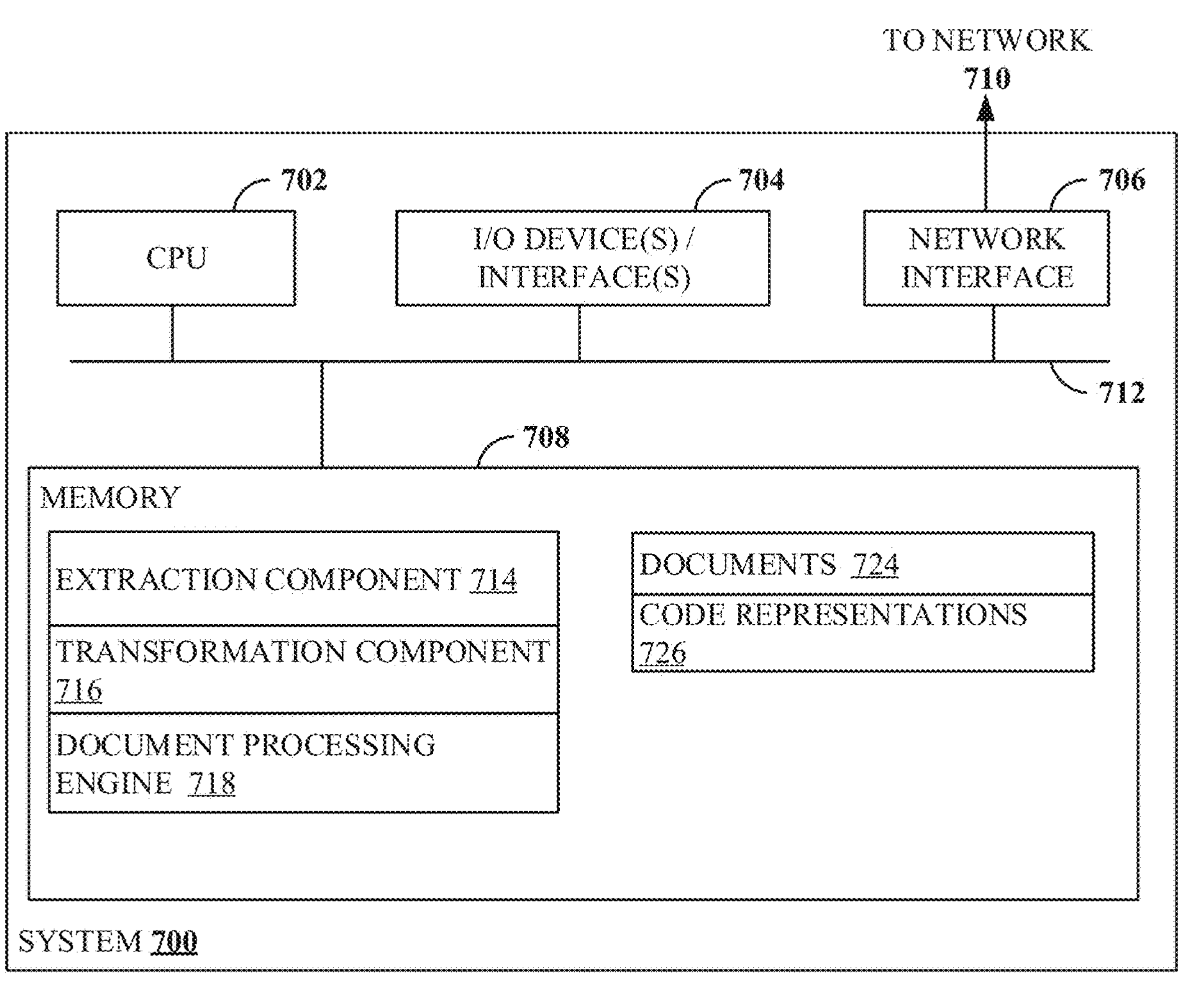
FIG. 7 depicts an example of a processing system for automatically processing electronic documents.

Example of a Processing System for Automatically Processing Electronic Documents FIG. 7 illustrates an example system 700 with which embodiments of the present disclosure may be implemented. For example, system 700 may be configured to perform operations 600 of FIG. 6 and/or to implement one or more components as in FIG. 1 or FIG. 2.

System 700 includes a central processing unit (CPU) 702, one or more I/O device interfaces that may allow for the connection of various I/O devices 704 (e.g., keyboards, displays, mouse devices, pen input, etc.) to the system 700, network interface 706, a memory 708, and an interconnect 712. It is contemplated that one or more components of system 700 may be located remotely and accessed via a network 710. It is further contemplated that one or more components of system 700 may comprise physical components or virtualized components.

CPU 702 may retrieve and execute programming instructions stored in the memory 708. Similarly, the CPU 702 may retrieve and store application data residing in the memory 708. The interconnect 712 transmits programming instructions and application data, among the CPU 702, I/O device interface 704, network interface 706, and memory 708. CPU 702 is included to be representative of a single CPU, multiple CPUs, a single CPU having multiple processing cores, and other arrangements.

Additionally, the memory 708 is included to be representative of a random access memory or the like. In some embodiments, memory 708 may comprise a disk drive, solid state drive, or a collection of storage devices distributed across multiple storage systems. Although shown as a single unit, the memory 708 may be a combination of fixed and/or removable storage devices, such as fixed disc drives, removable memory cards or optical storage, network attached storage (NAS), or a storage area-network (SAN).

As shown, memory 708 includes extraction component 714, transformation component 716, and document processing engine 718. Extraction component 714 may be representative of extraction component 200 of FIG. 2. In some embodiments, transformation component 716 may be representative of transformation component 100 of FIG. 1 or FIG. 2. Document processing engine 718 may be representative of document processing engine 120 of FIG. 1.

Memory 708 further comprises documents 724, which may correspond to any of the electronic documents described herein. Memory 708 further comprises code representations 726 which may correspond to any of the code representations of electronic documents described herein.

It is noted that in some embodiments, system 700 may interact with one or more external components, such as via network 710, in order to retrieve data and/or perform operations.

ADDITIONAL CONSIDERATIONS

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of automatically processing electronic documents, comprising:

generating, using a generative machine learning model, a code representation of an electronic document based on an entity comprising a row of items or a column of items of the electronic document;

generating an entity representation for the entity based on determining that the code representation corresponds to an incompatible format for an electronic document processing application, wherein the entity representation comprises an index indicator appended to an identifier for the entity;

applying a transformation to the entity representation to produce an intermediate code representation of the electronic document, wherein the transformation comprises a format for entities or a format for code representations of entities;

generating an updated code representation of the electronic document based on matching indexed item values from the electronic document to the transformed entity representation, wherein the undated code representation corresponds to a compatible format for the electronic document processing application; and uploading the updated code representation to the electronic document processing application.

2. The method of claim 1, wherein the entity is extracted using an extraction machine learning model that is configured to extract entities from documents.

3. The method of claim 1, wherein the entity comprises a column and each respective item within the entity comprises a value for the column at a respective row.

4. The method of claim 3, wherein generating the updated code representation of the electronic document comprises generating an item representation comprising a given value and a given index position indicator appended to the identifier for the entity, wherein the given value is a value for the column at a row that is indicated by the given index position indicator.

5. The method of claim 4, wherein item values are extracted and stored in an index, wherein the given value is retrieved from the index based on matching the given index position indicator to a position in the index that contains the given value.

6. The method of claim 1, wherein the transformation is applied automatically based on a target format for the transformed entity representation, wherein the target format is a format that is compatible with the electronic document processing application.

7. The method of claim 6, further comprising automatically processing the electronic document by the electronic document processing application based on the updated code representation.

8. The method of claim 1, wherein the transformation is applied based on user input specifying a format for entities or a format for entity representations.

9. The method of claim 1, wherein the format for entity representations comprises a different identifier for the entity.

10. A system for automatically processing electronic documents, comprising:

one or more processors; and a memory comprising instructions that, when executed by the one or more processors, cause the system to:

generate, using a generative machine learning model, a code representation of an electronic document based on an entity comprising a row of items or a column of items of the electronic document;

generate an entity representation for the entity based on determining that the code representation corresponds to an incompatible format for an electronic document processing application, wherein the entity representation comprises an index indicator appended to an identifier for the entity;

apply a transformation to the entity representation to produce an intermediate code representation of the electronic document, wherein the transformation comprises a format for entities or a format for code representations of entities;

generate an updated code representation of the electronic document based on matching indexed item values from the electronic document to the transformed entity representation, wherein the updated code representation corresponds to a compatible format for the electronic document processing application; and upload the updated code representation to the electronic document processing application.

11. The system of claim 10, wherein the entity is extracted using an extraction machine learning model that is configured to extract entities from documents.

12. The system of claim 10, wherein the entity comprises a column and each respective item within the entity comprises a value for the column at a respective row.

13. The system of claim 12, wherein generating the updated code representation of the electronic document comprises generating an item representation comprising a given value and a given index position indicator appended to the identifier for the entity, wherein the given value is a value for the column at a row that is indicated by the given index position indicator.

14. The system of claim 13, wherein item values are extracted and stored in an index, wherein the given value is retrieved from the index based on matching the given index position indicator to a position in the index that contains the given value.

15. The system of claim 10, wherein the transformation is applied automatically based on a target format for the transformed entity representation, wherein the target format is a format that is compatible with an electronic document processing system.

16. The system of claim 10, wherein the transformation is applied based on user input specifying a format for entities or a format for entity representations.

17. The system of claim 10, wherein the format for entity representations comprises a different identifier for the entity.

18. A non-transitory computer readable storage medium comprising instructions, that when executed by one or more processors of a computing system, cause the computing system to:

generate, using a generative machine learning model, a code representation of an electronic document based on an entity comprising a row of items or a column of items of the electronic document;

generate an entity representation for the entity based on determining that the code representation corresponds to an incompatible format for an electronic document processing application, wherein the entity representation comprises an index indicator appended to an identifier for the entity;

apply a transformation to the entity representation to produce an intermediate code representation of the electronic document, wherein the transformation comprises a format for entities or a format for code representations of entities;

generate an updated code representation of the electronic document based on matching indexed item values from the electronic document to the transformed entity representation, wherein the updated code representation corresponds to a compatible format for the electronic document processing application; and upload the updated code representation to the electronic document processing application.

* * * * *